(12) United States Patent
Reid et al.

(10) Patent No.: US 9,601,894 B2
(45) Date of Patent: Mar. 21, 2017

(54) FIBRE LASER

(71) Applicant: HERIOT-WATT UNIVERSITY, Edinburgh (GB)

(72) Inventors: Derryck Telford Reid, Bathgate (GB); Carl Farrell, Manchester (GB)

(73) Assignee: HERIOT-WATT UNIVERSITY, Edinburgh (GB)

( * ) Notice: Subject to any disclaimer, the term of this patent is extended or adjusted under 35 U.S.C. 154(b) by 0 days.

(21) Appl. No.: 14/500,063

(22) Filed: Sep. 29, 2014

(65) Prior Publication Data

US 2015/0055666 A1    Feb. 26, 2015

Related U.S. Application Data

(63) Continuation of application No. PCT/GB2013/050766, filed on Mar. 25, 2013.

(30) Foreign Application Priority Data

Mar. 30, 2012 (GB) .................................. 1205774.1

(51) Int. Cl.
| | |
|---|---|
| *H01S 3/067* | (2006.01) |
| *H01S 3/11* | (2006.01) |
| *H01S 3/08* | (2006.01) |
| *H01S 3/0941* | (2006.01) |
| *H01S 3/16* | (2006.01) |
| *H01S 3/00* | (2006.01) |

(52) U.S. Cl.
CPC ...... *H01S 3/06708* (2013.01); *H01S 3/06791* (2013.01); *H01S 3/1112* (2013.01); *H01S 3/0057* (2013.01); *H01S 3/0092* (2013.01); *H01S 3/0675* (2013.01); *H01S 3/06712* (2013.01); *H01S 3/08027* (2013.01); *H01S 3/08059* (2013.01); *H01S 3/09415* (2013.01); *H01S 3/1118* (2013.01); *H01S 3/1618* (2013.01)

(58) Field of Classification Search
CPC .................................................. H01S 3/06791
See application file for complete search history.

(56) References Cited

U.S. PATENT DOCUMENTS

| | | | |
|---|---|---|---|
| 5,627,848 A | 5/1997 | Fermann | |
| 7,339,727 B1 * | 3/2008 | Rothenberg et al. | 359/349 |
| 7,876,803 B1 * | 1/2011 | Di Teodoro et al. | 372/94 |
| 8,416,817 B2 | 4/2013 | Chong et al. | |

(Continued)

FOREIGN PATENT DOCUMENTS

| | | | |
|---|---|---|---|
| WO | 2004/059806 A2 | 7/2004 | |
| WO | WO 2008105833 A2 * | 9/2008 | ............... H01S 3/11 |
| WO | 2013/144600 A2 | 10/2013 | |

OTHER PUBLICATIONS

Farrell et al., "Octave-Spanning Super-Continuum from a Silica Photonic Crystal Fiber Pumped by a 386 MHz Yb:Fiber Laser," May 15, 2012, Optics Letters, vol. 37, No. 10, 1778-1780.*

(Continued)

*Primary Examiner* — Joshua King

(57) ABSTRACT

A fiber laser having an optical cavity that has an optical fiber and a curved mirror for imaging light leaving the fiber back into the fiber. The optical fiber has a round trip dispersion loss of less than 200000 $fs^2$. The round trip length of the optical fiber is less than 2.3 m.

17 Claims, 8 Drawing Sheets

(56) References Cited

U.S. PATENT DOCUMENTS

| | | | | |
|---|---|---|---|---|
| 8,526,110 | B1* | 9/2013 | Honea | H01S 3/06791 359/556 |
| 2002/0196815 | A1 | 12/2002 | Yoshida | |
| 2003/0156605 | A1 | 8/2003 | Richardson | |
| 2004/0085658 | A1* | 5/2004 | Henrich | H01S 3/1112 359/850 |
| 2004/0213302 | A1* | 10/2004 | Fermann et al. | 372/6 |
| 2005/0169324 | A1* | 8/2005 | Ilday et al. | 372/18 |
| 2005/0201432 | A1* | 9/2005 | Uehara et al. | 372/30 |
| 2005/0226286 | A1 | 10/2005 | Liu | |
| 2006/0120412 | A1* | 6/2006 | Liu | 372/6 |
| 2006/0227816 | A1* | 10/2006 | Liu | 372/6 |
| 2006/0291521 | A1* | 12/2006 | Ilday et al. | 372/94 |
| 2008/0212621 | A1 | 9/2008 | Furuya | |
| 2009/0141340 | A1 | 6/2009 | Sharping | |
| 2012/0327960 | A1* | 12/2012 | Wise | H01S 3/06725 372/6 |

OTHER PUBLICATIONS

Shaw et al., "IR Supercontinuum Generation in As—Se Photonic Crystal Fiber," 2005, OSA/ASSP, TuC5.*
Hundertmark et al., "Octave-Spanning Supercontinuum Generated in SF6-Glass PCF by a 1060 nm Mode-Loced Fibre Laser Delivering 20 pJ per Pulse," Feb. 2, 2009, Optics Express, vol. 17, No. 3, 1919-1924.*
Newport, "Tutorial," Mar. 11, 2003, http://hexagon.physics.wisc.edu/research/technical%20info/newport_fiber_tutorial.pdf.*
Chen et al., "Chirally-coupled-core Yb-fiber laser delivering 80-fs pulses with diffraction-limited beam quality warranted by a high-dispersion mirror based compressor", Optics Express, Nov. 22, 2010, vol. 18, No. 24, 24699, 7 pages.
Chong et al., "All-normal-dispersion femtosecond fibre laser with pulse energy above 20 nJ", Optics Letters, Aug. 15, 2007, vol. 32, No. 16, p. 2408-2410.
Chong et al., "Properties of normal-dispersion femtosecond fibre lasers", J. Opt. Soc. Am. B, Feb. 2008, vol. 25, No. 2, p. 140-148.
Damask, "Polarization Optics in Telecommunications", Physics and Astronomy, 2010, Table of Contents, 8 pages.
Gubin et al., "Femtosecond fiber laser based methane optical clock", Applied Physics, Lasers and Optics, Apr. 19, 2009, vol. 95, No. 4, p. 661-666.
Lefrancois et al., "Photonic crystal fiber based dissipative soliton laser for multi-Watt femtosecond mode-locking", Conference on Lasers and Electro-Optics (Cleo) and Quantum Electronics and Laser Science Conference, May 16-20, 2010, p. 1-2.
Liu et al., "Passive Harmonically Mode-Locked Yb3+-Doped Fiber Laser Free from Anomalous Dispersion", IEEE Photonics Technology Letters, Service Center, Dec. 1, 2010, vol. 22, No. 23, p. 1726-1728.
Morse et al., "High Repetition Rate, High Average Power, Femtosecond Erbium Fiber Ring Laser", Lasers and Electro-Optics, Conference on Quantum Electronics and Laser Science Conference, IEEE, Piscantaway, NJ, Jun. 2, 2009, p. 1-2.
Wilken et al., "High Repetition Rate, Tunable Femtosecond Yb-fiber Laser", Optical Society of America, 2010, 2 pages.
International Search Report and Written Opinion for PCT/GB2013/050766, mailed on Aug. 10, 2013, 14 pages.
Gomes, "Picosecond SESAM-Based Ytterbium Mode-Locked Fiber Lasers", IEEE Journal of Selected Topics in Quantum Electronics, 2004, vol. 10, No. 1, 129-136.
Search Report for Application GB1205774.1, mailed on Oct. 30, 2012, 2 pages.
Further Search Report for Application GB1205774.1, mailed on Mar. 4, 2013, 1 page.
Best et al., "Shredding Light on Hybrid Optics: A Tutorial in Coupling", Optics & Photonics News, Feb. 1999, p. 31-34.
Born et al., "Principles of Optics", 7th (Expanded) Edition, Electromagnetic Theory of Propagation, Interterence and Diffraction of Light, 1999, p. 152.
Hecht and Zajac., "Optics", Adelphi University, 4th Printing, Feb. 1979, p. 120-129.

* cited by examiner

FIBRE LASER

This application is a continuation application of International Application No. PCT/GB2013/050766, filed on Mar. 25, 2013, which claims the benefit under 35 U.S.C. §119(e) of Great Britain Application No. 1205774.1, filed on Mar. 30, 2012, each of which is incorporated by reference in its entirety.

FIELD OF THE INVENTION

The present invention relates to a fibre laser, and in particular a highly-doped Yb:fibre laser. The laser may be implemented in a ring cavity or a linear cavity configuration.

BACKGROUND OF THE INVENTION

Efficient, robust and practical self-referenced optical frequency combs require diode-pumped femto-second lasers which can provide high peak powers at high repetition rates, ideally in the multi-100-MHz region. Comb applications prefer higher repetition rate sources in order to achieve more power per mode. However, the need to implement self-referencing via octave-spanning super-continuum generation means that a compromise must be reached between repetition-rate and laser peak power.

Recently, the greater commercial availability of highly-doped Yb:fibre has extended the operation of femtosecond Yb:fibre ring lasers to 570 MHz [see T. Wilken et al "High Repetition Rate, Tunable Femtosecond Yb-fibre Laser," in Conference on Lasers and Electro Optics (Optical Society of America, 2010), paper CFK2]. Such fibre lasers have been used for the generation of octave-spanning super-continua. However, a problem with known systems is that they rely on the use of further amplification to achieve octave-spanning super-continua at repetition rates above 166 MHz [see H. Hundertmark et al "Octave-spanning supercontinuum generated in SF6-glass PCF by a 1060 nm mode-locked fibre laser delivering 20 pJ per pulse," Opt. Express 17, 1919 (2009), and I. Hartl, et al "GHz Yb-femtosecond-fibre laser frequency comb," in Conference on Lasers and Electro Optics (Optical Society of America, 2009), paper CMN1].

SUMMARY OF THE INVENTION

According to one aspect of the present invention, there is provided a fibre laser having an optical cavity comprising an optical fibre having a gain medium and imaging means for imaging light leaving the fibre back into the fibre. The optical cavity may be a ring cavity or a linear cavity.

Where the cavity is a ring, the imaging means are arranged to image light leaving one end of the fibre back into the other end of the fibre.

Where the cavity is linear, the imaging means are arranged to image light leaving one end of the fibre back into the same end of the fibre.

The optical fibre may have a round trip dispersion loss of less than 200000 $fs^2$, for example less than 180000 $fs^2$, for example less than 160000 $fs^2$, for example less than 153400 $fs^2$, for example less than 140000 $fs^2$ for example less than 120000 $fs^2$ for example less than 100000 $fs^2$.

The round trip length of the optical fibre is typically less than 2.3 m, preferably less than 1 m, for example less than 50 cm or less than 30 cm.

Modelocking means may be provided, for example an optical modulator such as a nonlinear polarisation evolution system and/or a saturable absorber.

The gain medium of the fibre may be a rare-earth ion-doped medium, such as a ytterbium-doped medium or erbium-doped medium.

At least one optical element may be provided for increasing the length of the optical cavity.

The optical cavity includes an output. Pulse time-compression means may be connected to the output. The pulse time-compression means may be a Gires Tournois interferometer.

The laser may be arranged to provide pulses having a duration of less than 1 ps, for example less than 500 fs, preferably less than 200 fs or less than 100 fs, and/or with an average power exceeding 500 mW and/or a repetition rate greater than 300 MHz. The pulses may be IR pulses.

A pump laser is provided, optionally wherein the pump beam has a minimum average power of 1 W.

According to another aspect of the present invention, there is provided a fibre laser having an optical cavity comprising an optical fibre having a gain medium, and a Gires Tournois interferometer for compressing output pulses, wherein the optical fibre has a round trip dispersion loss of less than 153400 $fs^2$ and/or a round trip length of less than 2.3 m, preferably less than 1 m, for example less than 50 cm or less than 30 cm.

Modelocking means may be provided, for example an optical modulator such as a nonlinear polarisation evolution system and/or a saturable absorber.

Imaging means may be provided for imaging light leaving the fibre back into the fibre. Where the optical cavity is a ring, the imaging means are arranged to image light leaving one end of the fibre back into the other end of the fibre. Where the optical cavity is linear, the imaging means are arranged to image light leaving one end of the fibre back into the same end of the fibre.

According to yet another aspect of the present invention, there is provided a system for generating a pulsed super-continuum comprising a laser of the other aspects of the invention adapted to generate pulses having a duration less than 200 fs, ideally less than 150 fs and means for causing nonlinear effects, such as self phase modulation and/or four-wave mixing and/or soliton self-frequency shifting of the pulses to provide a pulsed supercontinuum.

The means for causing nonlinear effects may comprise a photonic crystal fibre, for example, a photonic crystal fibre having a silica core or a core made of chalcogenide glasses and preferably having a length greater than 1 m.

The means for causing nonlinear effects may comprise a nonlinear waveguide made of semiconductor and nonlinear materials, such as periodically poled lithium niobate (PPLN) or periodically poled potassium titanyl phosphate (PPKTP).

The pulses may be IR pulses.

The supercontinuum may span at least one optical octave.

BRIEF DESCRIPTION OF THE DRAWINGS

Various aspects of the invention will now be described by way of example only and with reference to the accompanying drawings, of which.

DETAILED DESCRIPTION OF THE DRAWINGS

Figure 1:
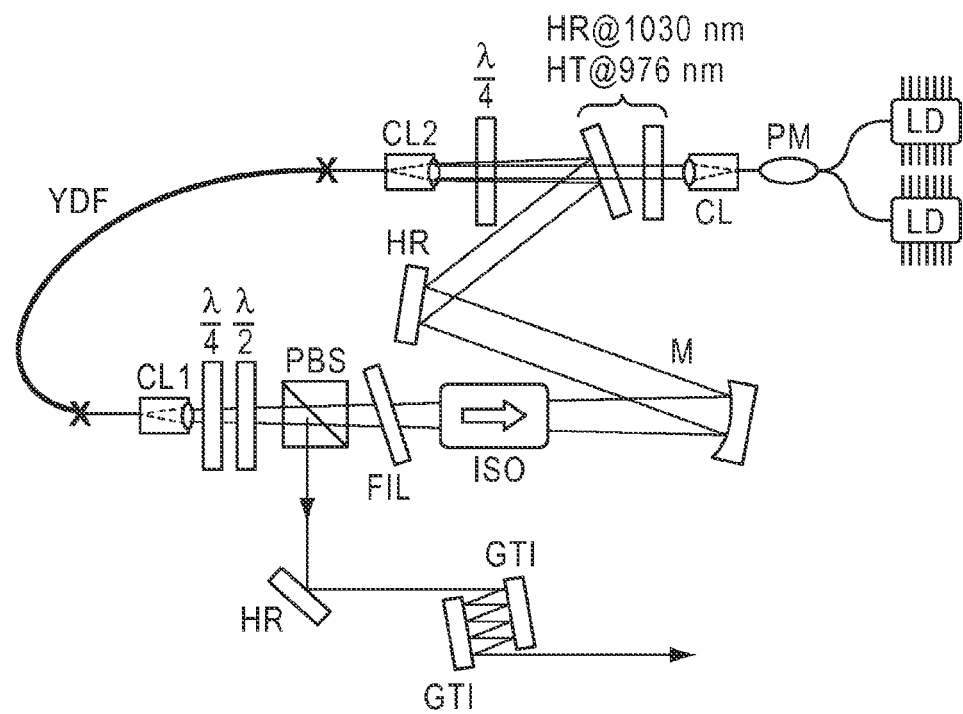
FIG. 1 is a schematic of a Yb:fibre ring laser.

FIG. 1 shows a fibre ring laser. The laser is pumped by two laser diodes LD that have outputs that are combined at a polarisation combiner PM. At the output of the polarisation combiner PM is a collimator CL. On a free space optical path from the collimator CL are in series two dichroic mirrors, one of which is highly reflective HR1 (at 1030 nm in the example shown) the other of which is highly transmissive HT (at 976 nm in the example shown), and a quarter wave plate. Downstream from the quarter wave plate is fibre based laser gain medium, in this example a ytterbium-doped fibre YDF. At each end of the fibre is a collimator CL1 and CL2. On the optical path from the collimated output of the fibre are a half-wave plate λ/2, a quarter-wave plate λ/4 and a polarisation beam splitter PBS.

The polarisation beam splitter PBS directs light of one polarisation along a free space optical path to an interference filter FIL and an optical isolator ISO. The isolator allows light to travel in only one direction. On the optical path from the isolator ISO is a curved mirror M that is positioned to direct light to a second high reflectance mirror HR2. The second high reflectance mirror HR2 directs light to the first high reflectance mirror HR1, so that light can circulate round the free space/fibre ring. The curved mirror M is arranged to image the mode from the first collimator (CL1) into the second collimator (CL2), so that light leaving one end of the fibre is imaged back into the other end. This provides an improvement in the laser output power. Ray paths illustrating this are shown in FIG. 1.

The free space components of the ring are arranged to ensure modelocking via nonlinear polarization evolution (NPE) [see A. Chong et al "All-normal-dispersion femtosecond fibre laser with pulse energy above 20 nJ," Opt. Lett. 32, 2408 (2007) and A. Chong, W. H. Renninger, F. R. Wise.

"Properties of normal-dispersion femtosecond fiber lasers," J. Opt. Soc. Am. B, 25, 140-148 (2008).]. This is a known technique and so will not be described in detail.

The other output of the polarisation beam splitter PBS directs chirped pulses of light of another polarisation along a free space optical path towards a high reflectance mirror HR, where it is directed to a Gires-Tournois interferometer GTI for pulse compression. The laser ouput is taken from the GTI output. The ring laser of FIG. 1 can be used to generate femtosecond pulses.

Efficient generation of de-chirped femtosecond pulses requires configuring the laser in a regime where the loss due to multiple reflections from the GTI mirrors is below the loss from a double-pass double-grating pulse compressor (typically 30% loss, assuming 92% diffraction efficiency per grating). For a laser cavity with group-delay dispersion GDD_laser, GTI mirrors with group-delay dispersion per bounce of GDD_mirror, de-chirping requires that, N>|GDD_laser/GDD_mirror where N is the number of mirror bounces. Obtaining a benefit over standard de-chirping schemes based on grating compressors requires that, $R^N>0.70$ or $N<-0.357/\ln(R)$ where R is the GTI mirror reflectivity (single-bounce). Typical values are R=0.997 and GDD_mirror=−1300 $fs^2$. This suggests N<118, giving a maximum laser cavity dispersion of 153400 $fs^2$. This is equivalent to approximately 2.3 m of fibre at 1030 nm.

The laser of FIG. 1 has been tested. In the experimental arrangement, the fibre section was a 19 cm length of ytterbium-doped fibre (YDF) with a fiberized collimator spliced onto each end. The collimators CL1 and CL2 each had a length of 4.5 cm giving a total fibre length of 28 cm. The free-space section was ~30 cm long and contained the components required for achieving modelocking via non-linear polarization evolution (NPE) assisted by spectral filtering [see A. Chong et al "All-normal-dispersion femtosecond fibre laser with pulse energy above 20 nJ," Opt. Lett. 32, 2408 (2007)]. The filter FIL had a bandwidth of 10 nm and was angled to transmit a centre wavelength of 1030 nm. The output from the laser was taken from a NPE rejection port through the polarization beamsplitting cube. The YDF was core-pumped by two 976-nm fibre-pigtailed temperature controlled diodes, which were polarization combined into a single fibre using the polarisation combiner PM. The polarisation combiner PM had a fiberized collimator spliced onto its output which matched that of the input to the YDF and provided a total pump power of 1.35 W. The pump power was coupled into the YDF with an efficiency of 78% through two dichroic mirrors, which were highly transmitting at 976 nm and highly reflective at 1030 nm.

The conventional geometry for a NPE ring oscillator assumes perfect collimation of the light as it travels between the two intracavity collimators but, in practice, diffraction limits the coupling efficiency into the second collimator. By introducing a curved mirror, the mode from the first collimator (CL1) was imaged into the second collimator (CL2), yielding an improvement in the laser output power.

Figure 2:
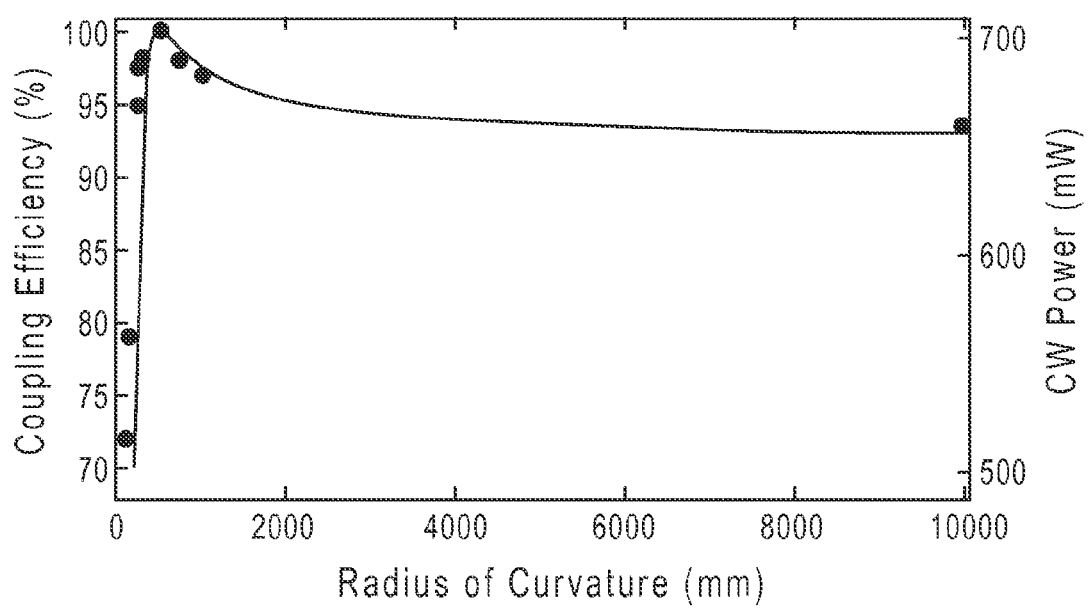
FIG. 2 is a plot of calculated coupling efficiency (left axis, solid line) for light travelling from collimator CL1 to CL2 as the radius of curvature of the intracavity mirror was varied, and measured CW output power (right axis, symbols). The experimental point at a radius of 10000 mm corresponds to a plane mirror.

Power data obtained in continuous-wave (CW) operation are shown in FIG. 2 for various curvatures of intracavity folding mirror, M. The solid curve in FIG. 2 is the theoretical mode-coupling efficiency [see J. M. Damask, Polarization Optics in Telecommunications (Springer, 2010)] calculated using a simple ABCD matrix model. With an optimized intracavity mirror of radius −500 mm, the Yb:fibre laser delivered a modelocked output power of 605 mW at a repetition rate of 386 MHz, corresponding to an optical-to-optical efficiency of ~45%. The laser was very stable in operation and self-starting.

Figure 3:
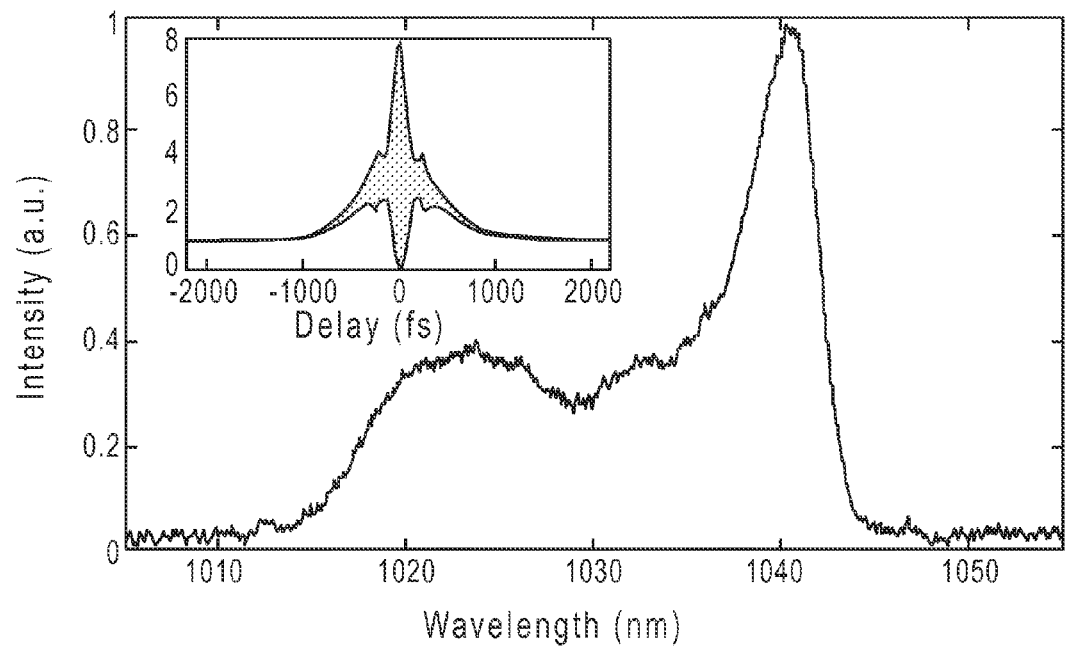
FIG. 3 is an optical spectrum from the mode-locked Yb:fibre laser and (inset) corresponding interferometric autocorrelation.

FIG. 3 shows the optical spectrum of the pulses directly after the laser cavity, along with a corresponding two-photon interferometric autocorrelation measurement. The spectrum cannot be described by the more common Gaussian or $sech^2(t)$ intensity profiles, so an estimation of the duration and pulse shape of the pulses exiting the mode-locked laser was made by using a fitting procedure. For this, the optical spectrum was recalibrated into frequency where quadratic and cubic spectral phase was added before Fourier transforming it to obtain the corresponding pulse in time. The autocorrelation of this pulse was then numerically calculated and compared with the experimentally measured autocorrelation trace. The value of quadratic spectral phase was then adjusted until there was a close agreement between the experimental and numerical autocorrelation profiles. The amount of quadratic spectral phase corresponding to the best-fit result was −19000 $fs^2$, giving a full-width half-maximum pulse duration of 750 fs. A direct Fourier transform of the spectrum implied transform-limited durations of 100 fs.

Figure 4:
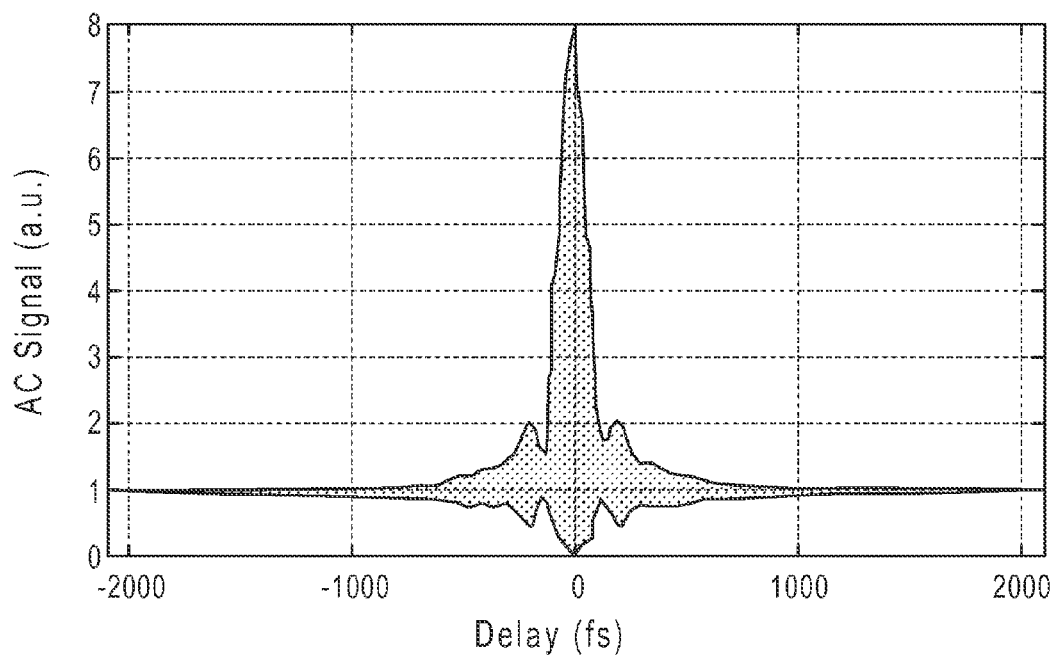
FIG. 4 shows an interferometric autocorrelation from the compressed mode-locked Yb:fibre (inset is the calculated pulse profile)

To compress the chirped pulses, a pair of Gires-Tournois interferometer (GTI) mirrors was employed. These mirrors have high reflectivity and are group-delay dispersion (GDD) values of ∼−1300±150 $fs^2$. Using 14 reflections (7 on each GTI mirror) and 1 reflection from a steering mirror of −600 $fs^2$ the pulse was compressed to its minimum value. This configuration corresponded to a total GDD of −18800 $fs^2$, in good agreement with the value inferred from the fitting procedure. The interferometric autocorrelation of the compressed pulse is depicted in FIG. 4. Using the analysis outlined above, a pulse duration of 110 fs was calculated from the autocorrelation trace. The profile of the compressed pulse is shown in the inset of FIG. 4. The average power after the compressor set-up was 580 mW giving a pulse peak power of 13.7 kW.

The high-peak-power fs Yb:fibre laser can be used to generate an octave-spanning super-continuum, as a precursor to implementing f-to-2 f self-referencing for carrier-envelope offset stabilization. The generation of coherent octave-spanning super-continua is considerably more challenging at 1030 nm than at the more common Ti:sapphire wavelength of 800 nm. The longer wavelength implies fibre mode-field areas approaching double those used in Ti:sapphire-pumped photonic crystal fibre (PCF), implying the need for longer lengths of PCF and/or laser sources with higher average powers. Furthermore, in comparison to Ti:sapphire lasers, the longer pulses produced by Yb lasers make it more difficult to launch first-order solitons, leading to the generation in the PCF of multiple Raman solitons, which can reduce the coherence across the super-continuum spectrum.

The suitability of the Yb:fibre laser for super-continuum generation has been assessed using a commercial PCF specifically designed for pumping by a 1030 nm ultrafast laser. The PCF core was composed of pure silica and had a diameter of 3.7 μm, a numerical aperture (NA) of 0.25 and a nonlinear coefficient of ∼18 $(W \cdot km)^{-1}$. The length of the PCF was 1.5 m and its zero dispersion wavelength (ZDW) was 975±15 nm. The pulses after the GTI compressor were coupled into the PCF with an efficiency of 75%, based on the input and output average powers of 570 mW and 430 mW, respectively. Compared with the figure reported earlier, the reduction in the input average power was due to the use of two slightly lossy steering mirrors, the leakage from one of which was used for monitoring purposes.

Figure 5:
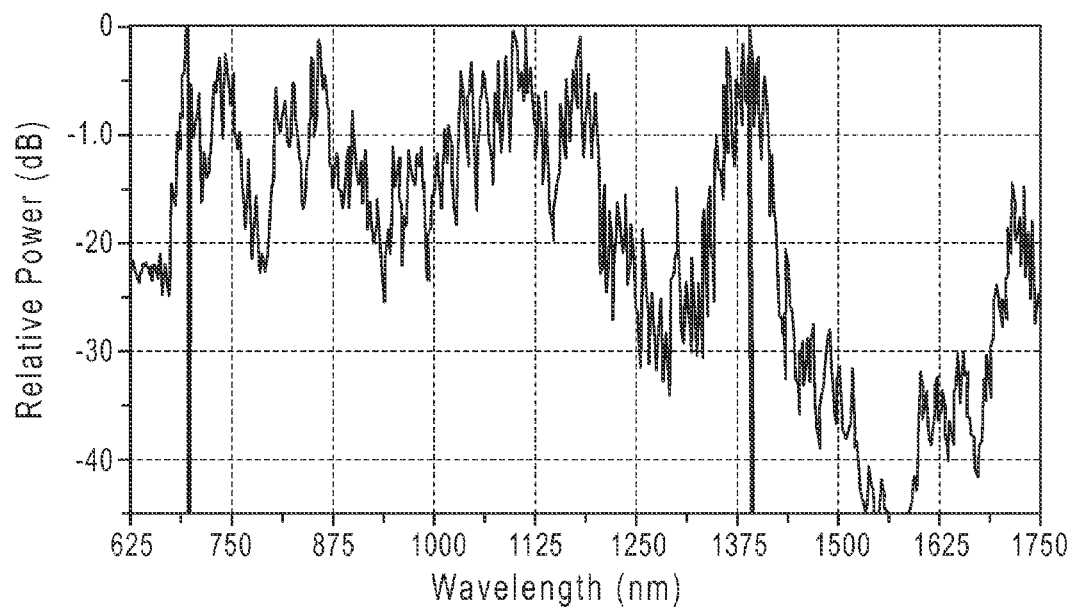
FIG. 5 shows an octave-spanning super-continuum spectrum generated inside a nonlinear fibre pumped by a mode-locked Yb:fibre laser.

FIG. 5 shows the super-continuum spectrum. A single, strong Raman-soliton pulse is evident on the long-wavelength side (λ∼1375 nm). This pulse contains >100 mW of average power and can be easily filtered from the rest of the super-continuum spectrum. Autocorrelation measurements showed that these pulses were very stable and chirp-free with a pulse duration of 105 fs. Dispersive waves on the short-wavelength side of the super-continuum (λ<975 nm) were generated with significant spectral intensities to wavelengths just below 700 nm. The blue and red vertical lines in FIG. 5 denote, respectively, wavelengths of 696 nm and 1392 nm, which correspond to one octave and indicate that the Yb:fibre laser has the potential for f-to-2 f self-referencing.

The ring laser tested achieved octave-spanning super-continuum generation in a silica photonic crystal fibre (PCF) pumped by a compact, efficient, modelocked all-normal dispersion Yb:fibre laser. The laser achieved 45% optical-to-optical efficiency by using an optimized resonator design, producing chirped 750-fs pulses with a repetition rate of 386 MHz and an average power of 605 mW. The chirped pulses were compressed to 110 fs with a loss of only 4% by using multiple reflections on a pair of Gires-Tournois interferometer mirrors, yielding an average power of up to 580 mW. The corresponding peak power was 13.7 kW and produced a super-continuum spectrum spanning from 696-1392 nm.

In the example of FIG. 5, the pulse duration was 105 fs, but other durations could be used. Typically, to generate a coherent supercontinuum would require pulses incident on the fibre to have durations of less than 200 fs, for example less than 150 fs more typically 100 fs. The peak power required depends on the type of fibre used and its length. A typical figure would be 10 kW coupled peak power. However, this can be much lower if a "high gamma" (=high nonlinearity) fibre is used. Under optimal conditions, the length of the PCF fibre could be as short as a few mm.

In summary, a highly efficient Yb:fibre ring oscillator capable of >50% optical-to-optical efficiency in continuous-wave mode and 45% optical-to-optical efficiency when modelocked has been demonstrated. The efficiency of the laser is optimized by using intracavity imaging with a curved reflector. High loss typical of a diffraction-grating compressor was avoided by using GTI mirrors to achieve sevenfold compression of the pulses directly leaving the laser with only 4% loss. The use of a short, highly-doped length of Yb:fibre achieves pulses from the laser whose chirp is sufficiently small to allow compression with only GTI mirrors. Despite the requirement to employ a short length of gain fibre, the extension to much lower repetition rates is readily achievable by changing the curvature of the intracavity imaging mirror, which allows the collimators to be placed potentially several meters apart without experiencing diffraction loss.

Figure 6:
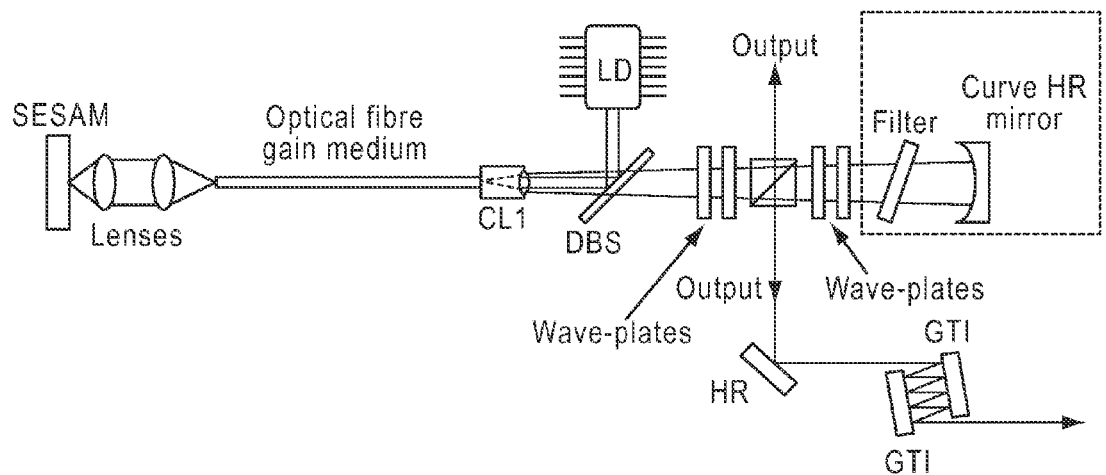
FIG. 6 is a schematic of a fibre based laser with a linear cavity.

FIG. 6 shows an example of fibre laser that has a linear laser cavity design. This laser is based on the same principles as the ring lasers previously described, in that it uses a curved mirror to image light that has left the fibre gain medium back into that medium, and a relatively short length of fibre (for example less than 2 meters, and typically less than 50 cm). The cavity is defined by semiconductor saturable absorber mirror (SESAM) and a curved high reflectance mirror HR.

Along the optical path from the SESAM is a pair of lenses for collimating and then focusing light into a length of ytterbium-doped fibre YDF. Light output from the fibre passes through a collimator CL1 and along a free space optical path through a beam splitter DBS to a first pair of quarter wave plates, a polarisation beam splitter PBS, a second pair of quarter wave plates, a filter and then is incident on the curved high reflectance mirror HR.

The curved mirror HR is arranged to image light that has left one end of the fibre back into the fibre. In this case, because of the linear arrangement, light is imaged back into the same end of the fibre via the collimator. Ray paths are illustrated in FIG. 6, showing light being collimated when leaving one end of the fibre, imaged back by the curved mirror and focused into the same end of the fibre on the return path. This provides an improvement in the laser output power. In this case, light makes two passes through the fibre in each round trip, and so the round trip length is twice the physical length of the fibre.

As for the ring laser, NPE is used as the modelocking mechanism and the free space optical components in the cavity are arranged to provide this. The SESAM is used to initiate self-starting. Light from a laser diode is injected into the linear cavity using the beam splitter DBS and is output at the polarisation beam splitter PBS. The chirped output pulses are compressed using a pair of Gires-Tournois interferometer (GTI) mirrors.

Figure 7:
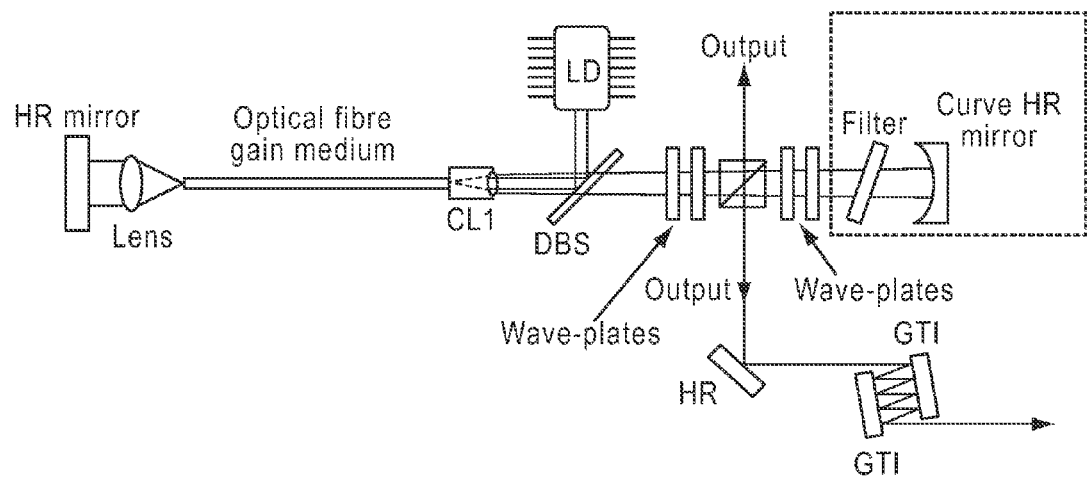
FIG. 7 is a schematic of another fibre based laser with a linear cavity.
Figure 8:
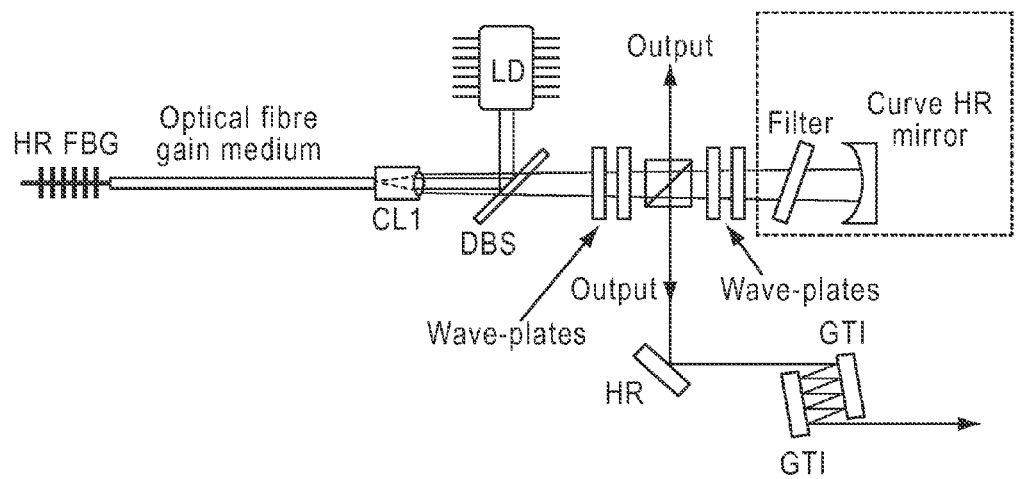
FIG. 8 is a schematic of yet another fibre based laser with a linear cavity.

FIGS. 7 and 8 show other linear cavity lasers. These are identical to the laser of FIG. 6, except the SESAM and paired lens arrangement is replaced in FIG. 7 by a high reflectance mirror and a single lens and in FIG. 8 by a high reflectance fibre bragg grating FBG. A negatively-chirped FBG could be used to manage the intracavity dispersion so that the circulating pulses retained sufficient chirp to allow the spectral-filter-assisted NPE modelocking mechanism to work, but had a small enough chirp to allow efficient compression by extracavity GTI mirrors.

Figure 9:
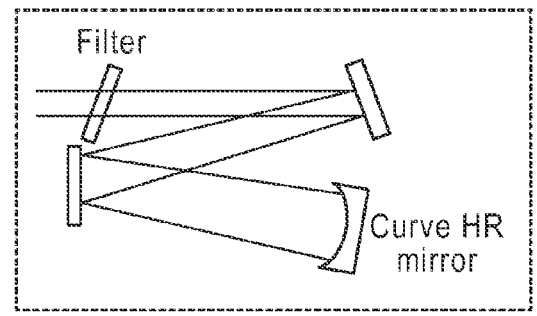
FIG. 9 is a mirror arrangement that can be used in any of the fibre based lasers of FIGS. 1 and 6 to 8 to increase the free space path length.
Figure 10:
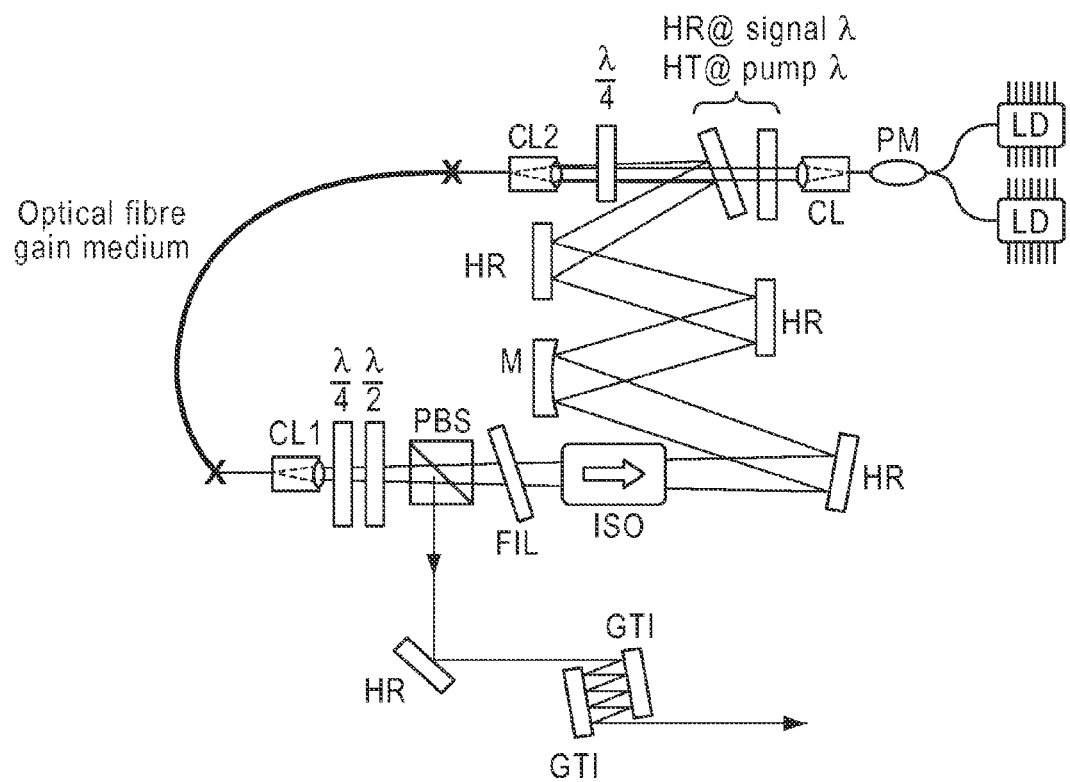
FIG. 10 shows the mirror arrangement of FIG. 9 in the fibre ring laser of FIG. 1.

The length of the free space section of the cavity of each of the lasers of FIGS. 1, and 6 to 8 could be extended to lower the repetition rate. To do this, a folding mirror arrangement, such as shown in FIG. 9 could be inserted between the curved mirror and the filter. Here the radius of curvature of the curved HR mirror would be optimised to increase the efficiency, for example by folding the beam path to the curved mirror in a "z-configuration". This keeps the system compact. FIG. 10 shows the free space cavity extension implemented in the ring laser of FIG. 1.

The fibre laser of the present invention has many applications, for example in pump-probe spectroscopy; pump source for optical parametric oscillator; optical frequency synthesis; amplifier seeding; asynchronous optical sampling (using two locked fibre laser sources); optical sampling; optical frequency metrology; semiconductor device probing via linear or nonlinear absorption and subsequent carrier generation; THz generation, via optical rectification or photoconductive switch; nonlinear microscopy through two-photon generation, second-harmonic generation, and CARS schemes or other nonlinear effects. As a specific example, the fibre laser of the present invention can be used to pump an optical parametric oscillator (OPO).

Figure 12A:
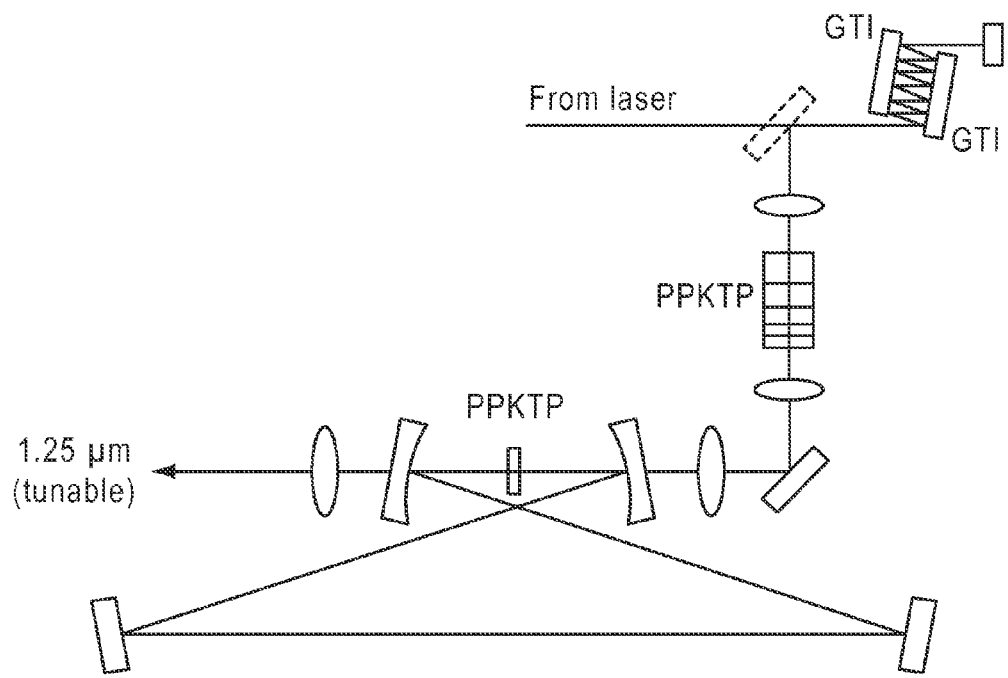
FIG. 12A is a schematic of a ring cavity optical parametric oscillator.
Figure 12B:
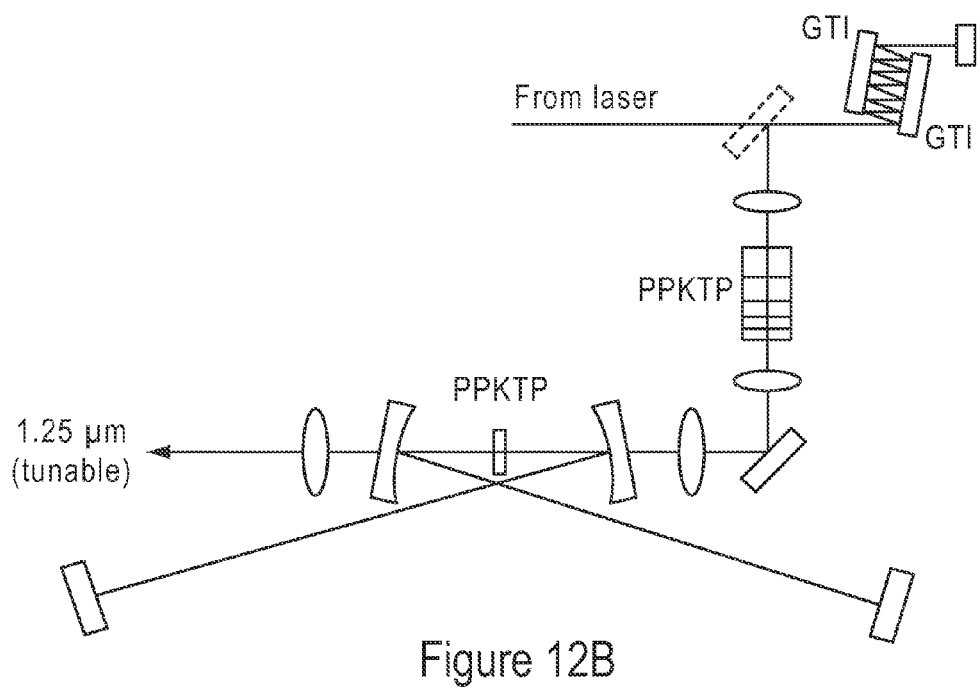
FIG. 12B is a schematic of a linear cavity optical parametric oscillator.

FIGS. 12A and 12B show the output of the fibre laser of the present invention coupled into an OPO that has a non-linear material for generating an optical parametric process. FIG. 12A is a ring cavity OPO and FIG. 12B is a standing-wave cavity OPO. These OPO configurations are known and so will not be described in detail. Light leaving the intracavity polarising beamsplitter in the laser is dechirped as previously described using a pair of GTI mirrors (shown in FIG. 12A and FIG. 12B). This is then frequency doubled in a non-linear optical material and input to the OPO cavity. Oscillation occurs when the roundtrip optical cavity length of the OPO is equal to that of the pump laser.

Figure 13:
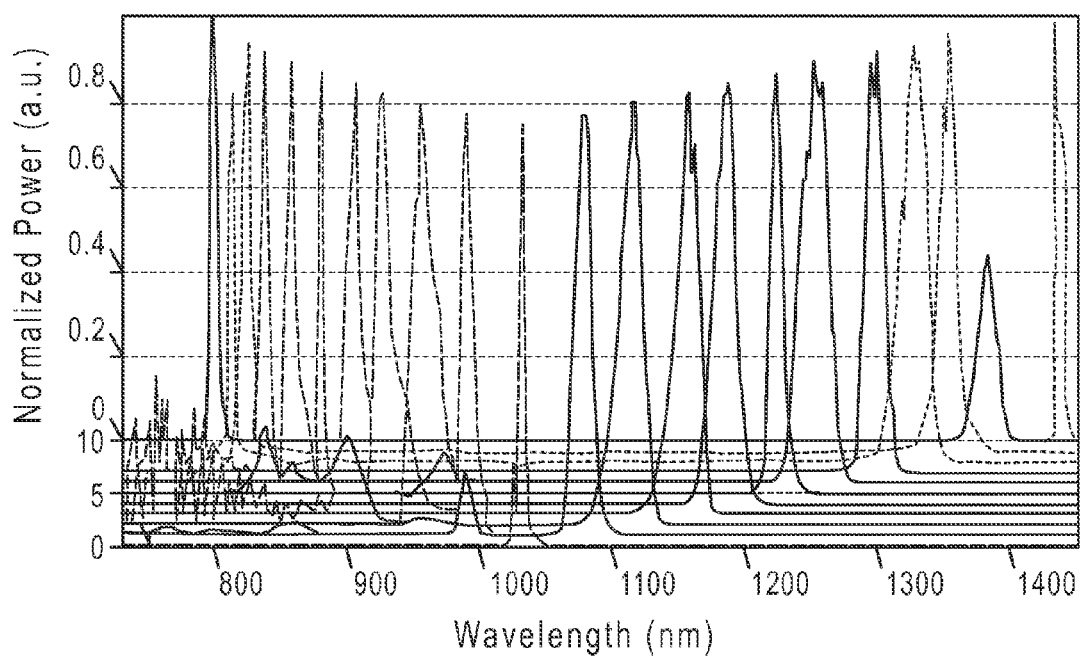
FIG. 13 shows measured spectra for the OPO of FIG. 12B.

In a test set up, the non-linear optical material used was periodically poled potassium titanyl phosphate (PPKTP) was used with grating periods in the range 7.668-8.468 μm and a length of 1 mm. By matching the PPKTP crystal's conversion bandwidth to the chirp and bandwidth of the 1030-nm pulses from the Yb:fibre oscillator, second harmonic generation can be optimised. The input lens focal length was 15 mm and the output focal length was 32 mm. The frequency doubled light (or second harmonic generation (SHG)) light is focused with a 75-mm focal length lens into the OPO cavity. The mirrors had specifications HR @ ~800-1000 nm; HT @ ~516 nm+1030-1500 nm. The plano-concave curved mirrors have radii=−75 mm. The minimum pump power required for oscillation was 100 mW (average). FIG. 13 shows measured spectra for the OPO of FIG. 12B, showing tunability in the range 820-1410 nm.

The test system described above allowed (a) visible pumping of a fs OPO in the green; and (b) the use PPKTP to optimise power in green pump pulses. This gives broad tunability at wavelengths on either side of the original 1030-nm fibre laser wavelength, allowing for continuous wavelength coverage over nearly an octave bandwidth.

Applications that use super-continuum generation include: frequency comb generation, with additional super-continuum generation to cover one octave; CARS spectroscopy, with additional frequency conversion using super-continuum generation or optical parametric oscillation; optical coherence tomography (with super-continuum extension) and mid-infrared generation using difference-frequency generation between laser and super-continuum.

Figure 11:
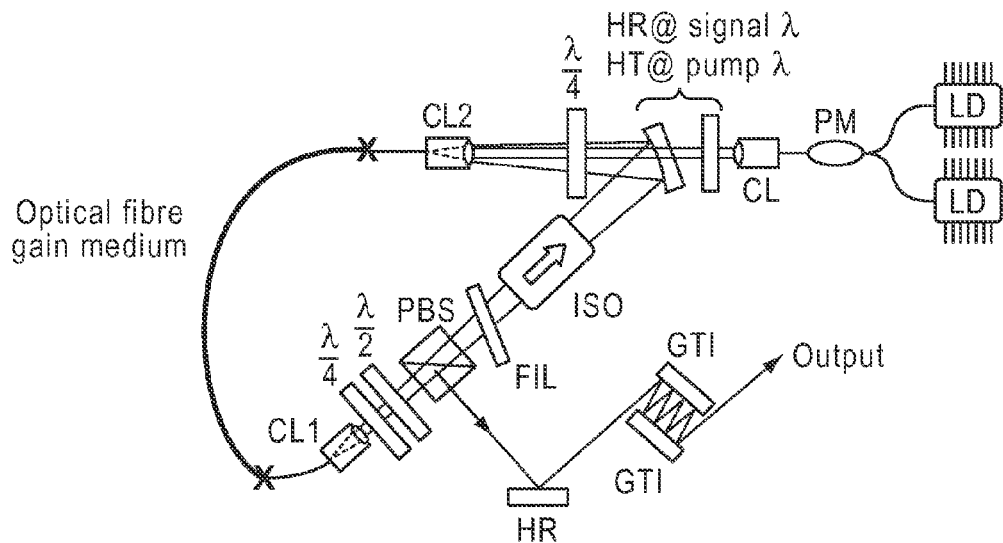
FIG. 11 a schematic of another ring laser.
Figure 14:
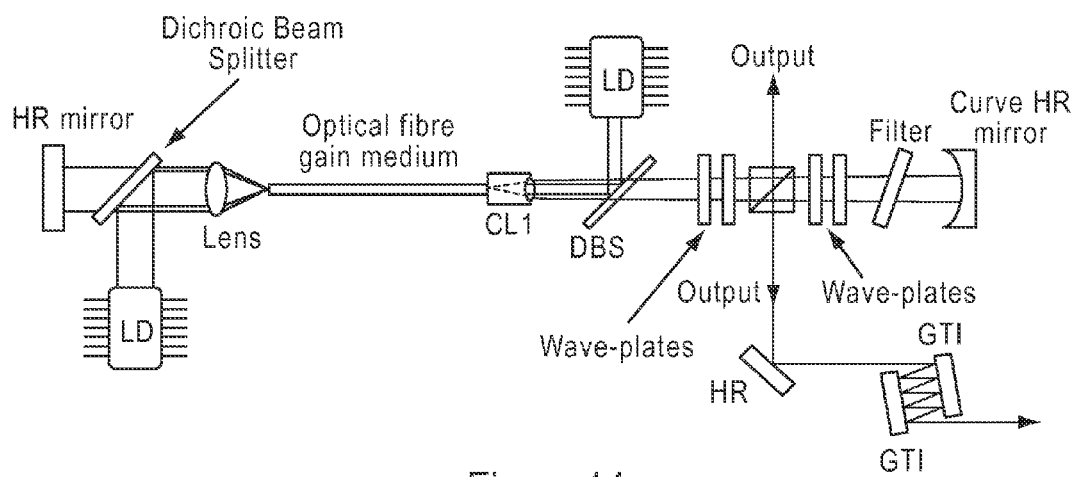
FIG. 14 is a schematic of a linear cavity laser pumped using a bi-directional scheme.
Figure 15:
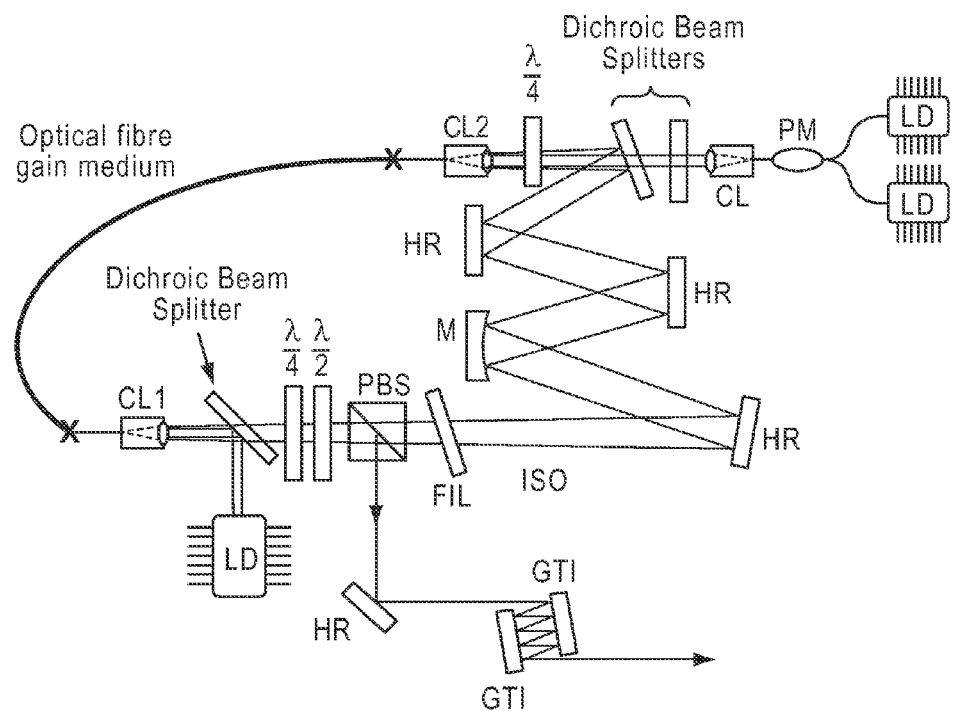
FIG. 15 is a schematic of a ring cavity laser pumped using a bi-directional scheme.

A skilled person will appreciate that variations of the disclosed arrangements are possible without departing from the scope of the invention. For example, FIG. 11 shows a ring laser based on that of FIG. 1, but in which one of the pair of dichroic mirrors is curved and used to image light from CL1 to CL2. In this case, the curved mirror M and one of the plane high reflectors of FIG. 1 can be omitted. This shortens the overall cavity length thus allowing a higher-repetition-rate. Also, all of the lasers described could be pumped from both ends in a bi-directional scheme. This is illustrated in FIG. 14 for the linear cavity and FIG. 15 for the ring cavity. It will also be apparent that the laser could operate, with a suitable fibre, in frequency regions outside IR, for example in the visible or UV region. Accordingly the above description of the specific embodiment is made by way of example only and not for the purposes of limitation. It will be clear to the skilled person that minor modifications may be made without significant changes to the operation described.

The invention claimed is:

1. A mode locked fibre laser comprising an optical cavity, wherein the optical cavity comprises:
   an optical fibre comprising a gain medium, a first optical fibre end, a second optical fibre end, and an optical fibre length;
   a first collimator, wherein the first collimator is configured to collimate light from the first optical fibre end;
   a second collimator, wherein the second collimator is configured to image light into the second optical fibre end;
   a free space optical path between the first collimator and the second collimator comprising a free space optical path length, wherein the free space optical path length is greater than the optical fibre length;
   a curved mirror within the free space optical path, wherein, the curved mirror is located at a first distance from the first collimator and at a second distance from the second collimator;

the curved mirror is characterized by a radius of curvature characterized by a focal length wherein the focal length is less than the second distance; and the radius of curvature and the location of the curved mirror within the free space optical path is configured to image light from the first collimator into the second collimator and thereby increase optical-to-optical coupling efficiency and reduce diffraction loss; and at least one mode locking element optically coupled to the free space optical path.

2. The mode locked fibre laser of claim 1, wherein the optical fibre is characterized by a round trip dispersion loss of less than 200000 fs².

3. The mode locked fibre laser of claim 1, wherein the at least one mode locking element comprises a pulse time-compression device.

4. The mode locked fibre laser of claim 1, wherein, the at least one mode locking element comprises a Gires Tournois interferometer; and the optical fibre is characterized by, a round trip loss of less than 200000 fs²; a round trip length of less than 2.3 m; or a combination thereof.

5. The mode locked fibre laser of claim 1, wherein the optical cavity is configured to provide,
pulses characterized by a duration of less than 1 ps;
an average power exceeding 500 mW; and
a repetition rate greater than 300 MHz.

6. The mode locked fibre laser of claim 1, wherein the optical cavity is configured to provide,
pulses characterized by a duration of less than 1 ps;
an average power exceeding 500 mW; and
a repetition rate greater than 300 MHz.

7. A system for generating a pulsed supercontinuum comprising:
the mode locked fibre laser of claim 1, wherein the mode locked fibre laser is configured to generate pulses characterized by a duration less than 200 fs; and
a device configured to cause a nonlinear effect on the pulses to provide a pulsed supercontinuum.

8. The system of claim 7, wherein the device configured to cause a nonlinear effect comprises a photonic crystal fibre comprising a core, wherein,
the core is selected from a silica core and a chalcogenide glass core; and
the core is characterized by a length greater than 1 m.

9. The system of claim 7, wherein the device configured to cause a nonlinear effect comprises a nonlinear waveguide.

10. The system of claim 7, wherein the supercontinuum spans at least one optical octave.

11. A system for generating a pulsed tunable output comprising:
the mode locked fibre laser of claim 1 configured to generate pulses characterized by a duration less than 200 fs; and
a device configured to cause a non-linear frequency conversion of the pulses to provide a tunable pulsed source.

12. The system of claim 11, wherein the system comprises an optical parametric oscillator.

13. The mode locked fibre laser of claim 1, wherein, the mode locked fibre laser further comprises a coupler for coupling light from a pump source into the optical-cavity; and the gain medium is pumped using the light from the pump source.

14. The mode locked fibre laser of claim 1, wherein the at least one mode locking element comprises components for achieving modelocking via nonlinear polarization evolution assisted by spectral filtering.

15. The mode locked fibre laser of claim 1, wherein the at least one mode locking element is disposed between the first collimator and the curved mirror.

16. The mode locked fibre laser of claim 1, wherein the mode locked fibre laser is characterized by an optical-to-optical efficiency of at least 45% operating in a mode locked mode.

17. The mode locked fibre laser of claim 1, wherein the diffraction loss is reduced by at least 2% compared to the diffraction loss when the curved mirror is replaced with a plane mirror.

* * * * *